United States Patent [19]
Watabe et al.

[11] 4,053,446
[45] Oct. 11, 1977

[54] PROCESS FOR PREPARING HIGH TEAR-STRENGTH POLYDIENE POLYURETHANE

[75] Inventors: Yoji Watabe, Fuchu; Michio Ishii, Murayama; Yutaka Iseda, Tachikawa; Kouei Komatsu; Noboru Ohshima, both of Yokkaichi, all of Japan; Yozo Nakata, deceased, late of Kawasaki, Japan, by Kiichi Nakata, legal successor

[73] Assignees: Bridgestone Tire Company, Ltd.; Japan Synthetic Rubber Company, Ltd., both of Tokyo, Japan

[21] Appl. No.: 719,130

[22] Filed: Aug. 31, 1976

[30] Foreign Application Priority Data

Sept. 9, 1975 Japan ............... 50-108519

[51] Int. Cl.² ............... C08G 18/62; C08K 3/04
[52] U.S. Cl. ............... 260/37 N; 260/77.5 CR; 260/77.5 AP; 528/480; 528/487; 260/77.5 AM
[58] Field of Search ............... 260/77.5 AP, 77.5 CR, 260/37 N, 77.5 AM; 528/480, 487

[56] References Cited
U.S. PATENT DOCUMENTS

| 3,135,716 | 6/1964 | Uraneck et al. | 260/515 P |
| 3,177,190 | 4/1965 | Hsieh | 260/27 |
| 3,607,976 | 9/1971 | Hsieh et al. | 260/859 |
| 3,966,668 | 6/1976 | Cain | 260/77.5 AP |

OTHER PUBLICATIONS

Kirk–Othmer, Encyclopedia of Chemical Technology, vol. 4, p. 255.
Krause et al., Rubber Chemistry and Technology, 41, 1305 (1968).

*Primary Examiner*—H.S. Cockeram
*Attorney, Agent, or Firm*—Brooks, Haidt, Haffner & Delahunty

[57] ABSTRACT

Polydiene polyurethanes having high tear strength are obtained by using polydiene glycols, prepared with use of lithium-based catalyst, having a number average molecular weight of 1,000 to 5,000 and functionality of 1.8 – 2.1, diisocyanates and chain-extending agents, and by controlling chemical cross-link density being $4 \times 10^{-5}$ mole/cc and less. When the chemical cross-link density is within the above range, elongation and tensile strength in addition to tear strength of the polyurethane are improved significantly. Furthermore, when 10 – 50 parts by weight of the specified carbon black are added to 100 parts by weight of the mixture of the prepolymer, the chain-extending agent and the additive prior to curing the prepolymer, these mechanical properties of the polyurethane are improved further.

11 Claims, 1 Drawing Figure

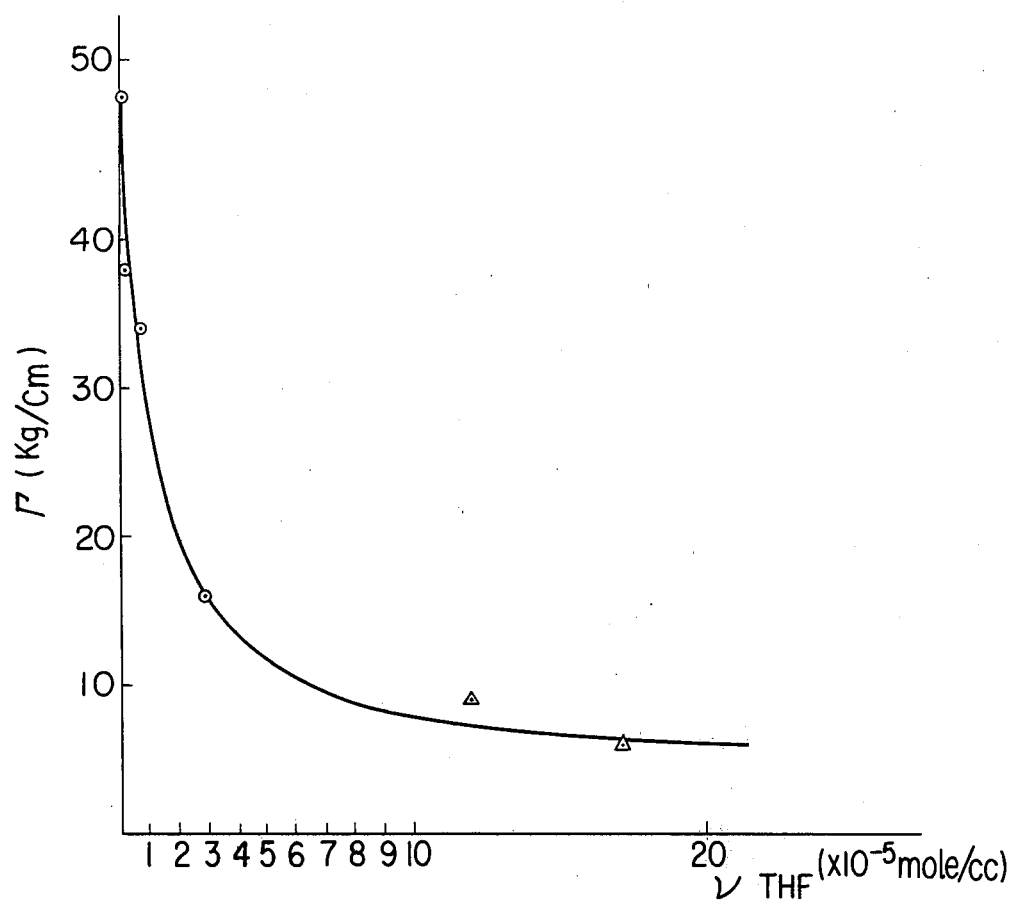

PROCESS FOR PREPARING HIGH TEAR-STRENGTH POLYDIENE POLYURETHANE

BACKGROUND OF THE INVENTION

1. Field of the Invention

This invention relates to a novel process for preparing polydiene polyurethanes, especially polydiene polyurethanes having significantly improved tear strength.

It is well known that polydiene polyurethanes comprise polydiene glycol, diisocyanate and chain-extending agent.

2. Description of the Prior Art

Polybutadiene polyurethanes, for example, which are made from polybutadiene glycols prepared by radical polymerization of butadiene with use of an initiator such as hydrogen peroxide have been generally used and well known. However, as they have poor mechanical properties, various methods for improving them have been proposed. For example, the method of incorporating reinforcing fillers such as carbon black, silica and zinc oxide, etc., to the raw polybutadiene polyurethane compositions, the method of increasing the amount of hard segments by isocyanate components or chain-extending agents, the method of blending polyether glycol, and the method of complicating networks by epoxide, sulfur and peroxide and others have been proposed. However, these proposed methods have little effect on the improvement of low tear strength which is the main disadvantage of polybutadiene polyurethanes, and furthermore affect adversely their good rubber like, elasticities at low temperatures and their water-durability. On the other hand, the polydiene glycol prepared with the use of lithium-based catalyst has been seldom used, because the undesirable abnormal gelation which takes place sometimes upon the preparation of prepolymer will cause damage to these mechanical properties.

SUMMARY OF THE INVENTION

It is an object of the invention to provide a process for preparing polydiene polyurethanes having significantly improved tear strength.

Another object of the invention is to provide a process for preparing polydiene polyurethanes having improved mechanical properties.

A further object of the present invention is to provide a process for preparing polydiene polyurethanes having well-balanced physical properties.

Still another object of the present invention is to provide a process for preparing polydiene polyurethanes which do not cause the undesirable abnormal gelation upon the preparation of the prepolymer.

The present invention provides a process for preparing a polydiene polyurethane having high tear strength, which comprises reacting polydiene glycol, diisocyanate and chain-extending agent by the prepolymer process well known in the prior art, said polydiene glycol being prepared with use of lithium-based catalyst, and the chemical cross-link density of said polydiene polyurethane being $4 \times 10^{-5}$ mole/cc and less.

Accordingly in one embodiment, the invention provides a process for preparing a polydiene polyurethane having high tear strength, in which said polydiene glycol is prepared with use of lithium-based catalyst, 10 to 50 parts by weight of carbon black are mixed with 100 parts by weight of a mixture of the prepolymer and the chain-extending agent before curing the prepolymer, wherein the ratio, $lp/d$, of the chain length, $lp$, between physical cross-links in the corresponding nonloaded polyurethane to the particle size, $d$, of said carbon black is within the range of from 2.4 to 15, and the chemical cross-link density of said corresponding non-loaded polydiene polyurethane is $4 \times 10^{-5}$ mole/cc and less.

It is the astonishing effect of the present invention that, when the chemical cross-link density of the polydiene polyurethane is less than $4 \times 10^{-5}$ mole/cc, tear strength is remarkably increased and tensile strength and elongation are also improved, thus the polydiene polyurethane according to the present invention has well-balanced mechanical properties.

Other and further objects, features and advantages of the invention will appear more fully from the following description.

BRIEF DESCRIPTION OF THE DRAWING

The FIGURE shows the correlation curve between tear strength ($\Gamma$) and chemical cross-link density ($\nu$THF) on the basis of the results of Examples I - IV and Comparative Example I.

DESCRIPTION OF THE PREFERRED EMBODIMENTS

The term "chemical cross-link" as used herein means cross-links which are not dissociated by swelling in polar solvents such as tetrahydrofuran and the term "physical cross-link" means cross-links which are dissociated by swelling in polar solvents, but are not dissociated by swelling in non-polar solvents such as chloroform.

The polydiene glycols to be used in the present invention are polydiene compounds having terminal hydroxyl groups obtained by the living polymerization of conjugated dienes containing 4 – 6 carbon atoms in the presence of lithium-based catalyst. The process to produce the polydiene glycol comprises the sequence of steps as follows: (A) the homopolymerization of a conjugated diene or copolymerization of a conjugated diene with another conjugated diene or an arylalkenyl compound in an inert solvent in the presence of a dilithio compound as an initiator; (B) the reaction of the polymer or the copolymer having lithium species at both terminals of the polymer chain with an alkylene oxide, (C) the treatment with the compounds containing at least one active hydrogen atom such as alcohols, water, mineral acids and the like in order to hydrolyze the products; (D) the purification of the final products by washing or treating with activated charcoals and others. The conjugated dienes which may be utilized in the present invention include, for example, 1,3-butadiene, isoprene, 2,3-dimethylbutadiene and the like, preferably 1,3-butadiene and isoprene, especially 1,3-butadiene. The alkenylaromatic compounds as comonomer include styrene, α-methylstyrene, vinyltoluene and others, preferably styrene.

Dilithio compounds may include, for example, 1,4-dilithiobutane, 1,5-dilithiopentane, 1,10-dilithiodecane, 1,4-dilithio-2-butene, 1,5-dilithionaphthalene, dilithiomethylnaphthalene, 1,4-dilithio-1,1,4,4-tetraphenylbutane, tetramers to eicosamers of dienes and olefinic monomers oligomerized in the presence of these dilithium compounds and the like. Mixtures of these compounds and some combinations of these compounds and other alkali metal compounds can also be utilized.

The inert solvents employed in the polymerization may include saturated aliphatic, alicyclic and aromatic hydrocarbons and mixtures thereof. Examples of these hydrocarbons which can be used may include butane, pentane, hexane, heptane, cyclohexane, benzene, toluene and xylene. Lewis bases such as diethyl ether, diisopropyl ether, tetrahydrofuran, dioxane, ethyleneglycol dimethyl ether, anisole, trimethylamine, dimethylaniline and others may be employed together for homogeneous polymerization if desired.

Examples of the alkylene oxides may include ethylene oxide, propylene oxide, butylene oxide, styrene oxide, epichlorohydrin, their mixtures, their solutions in the inert solvent and the like.

The number average molecular weight of the polydiene glycol useful in this invention is in the range of from 1,000 to 5,000, preferably from 1,300 to 3,500. The functionality of the polydiene glycol should be in the range of 1.8 to 2.1. If the functionality is less than 1.8, the mechanical properties of the polyurethane are damaged on account of the prevention of the chain-extending reaction. In the case of the functionality being above 2.1, on the other hand, the tear strength of the products is decreased because the chemical cross-link density can not be controlled within the specified range of the present invention.

It is preferable to minimize the residual lithium content in the polydiene glycol in order to avoid abnormal gelation at the time when the prepolymer is prepared by reacting polydiene glycol with diisocyanate. The abnormal gelation of the prepolymer causes significant damage of the mechanical properties of the products, or impossibility of the subsequent moulding process. The abnormal gelation characteristics of the prepolymer concern not only the residual lithium content in the polydiene glycol but also the treating method (C) of the polydiene glycol. That is, when the polydiene glycol is treated with mineral acids except sulfuric acid, the minor residual lithium content less than 100 ppm, more preferably less than 30 ppm does not cause the abnormal gelation. A lithium content of more than 100 ppm causes the abnormal gelation of the prepolymer occasionally or an increase of the chemical cross-link density of the product. Furthermore it has been found that when the polydiene glycol is treated thoroughly with sulfuric acid, the residual lithium content has little effect on the abnormal gelation of the prepolymer. This finding is observed through the composition of this invention.

The diisocyanates preferably used for the preparation of prepolymer may include, as for example, aliphatic diisocyanates such as tetramethylene-1,4-diisocyanate, hexamethylene-1,6-diisocyanate, 1,4-xylenediisocyanate and the like, alicyclic diisocyanates, as for example, ω, ω'-diisocyanate-1,2-dimethylcyclohexane, 1-methylcyclohexane-2,4-diisocyanate, 1-methylcyclohexane-2,6-diisocyanate, 1,3-cyclohexyldiisocyanate, 1,4-cyclohexyldiisocyanate, methylene(bis-4-cyclohexyl isocyanate), isophoronediisocyanate and others, aryldiisocyanates, such as 2,4-tolylenediisocyanate, 2,6-tolylenediisocyanate, 1,3-xylenediisocyanate, 5-chloro-2,4-tolylenediisocyanate, diphenyl-4,4'-diisocyanate, m-phenylenediisocyanate, p-phenylenediisocyanate, 1,4-naphthalenediisocyanate, 1,5-naphthalenediisocyanate, 2,6-naphthalenediisocyanate, 2,7-naphthalenediisocyanate, diphenylmethane-4,4'-diisocyanate, diphenyldimethylmethane-4,4'-diisocyanate, diphenylether-4,4'-diisocyanate, 3,3'-dimethyldiphenyl-4,4'-diisocyanate and the like, and mixtures thereof. In the preparation of the prepolymer, the equivalent ratio NCO/OH, of isocyanate groups to hydroxyl groups is in the range of 1.5 to 3.0, preferably 1.5 to 2.2.

The chain-extending agents which are used to cure the prepolymer in the invention may include compounds having active hydrogens, preferably diamines and diols. Examples of polyamines are aryldiamines such as 4,4'-methylenebis(2-chloroaniline), methylenedianiline, methylenebis(2-methoxyaniline), 2,2'-5-trichloro-4,4'-methylenedianiline, o-phenylenediamine, m-phenylenediamine, p-phenylenediamine, 2,6-dichloro-p-phenylenediamine, tolylene-2,4-diamine, bianisidine, diphenylether-4,4'-diamine, 4,4'-diphenyldiaminosulfone, 3,3'-diphenyldiaminosulfone, naphthalene-1,5-diamine, 2,4-diaminocumene, p-chloro-o-phenylenediamine, o-chloro-p-phenylenediamine, aryldiamines having the formula

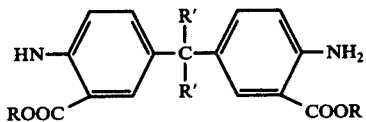

wherein R is selected from the group consisting of methyl, ethyl, propyl, butyl, hexyl, octyl, 3-methylpropyl and 1-methylpentyl, and R' is selected from the group consisting of hydrogen, methyl, ethyl, propyl, butyl, and hexyl, or

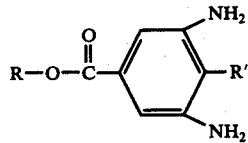

wherein R is selected from the group consisting of methyl, ethyl, propyl, butyl, 3-methylpropyl, 2-methoxyethyl, octadecyl and 2-methylhexyl, and R' is selected from the group consisting of methyl, ethyl, propyl, 3-methylpropyl and halogen, and aliphatic diamines such as hydrazine, ethylenediamine, trimethylenediamine, hexamethylene-1,6-diamine, piperazine, propylenediamine and the like, and derivatives and combinations thereof. Among them, it is preferred to use 4,4'-methylenebis(2-chloroaniline), methylenedianiline, naphthalene-1,5-diamine, o-phenylenediamine, m-phenylenediamine, p-phenylenediamine, tolylene-2,4-diamine, diphenylether-4,4'-diamine, hydrazine, ethylenediamine, 2,6-dichlorophenylenediamine, hexamethylene-1,6-diamine, and aryldiamine compounds of the formula

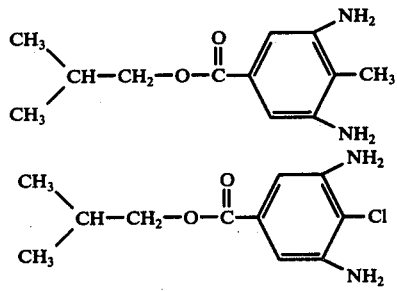

and

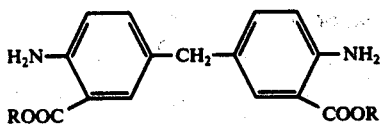

wherein R is selected from the group consisting of methyl, ethyl, propyl and butyl. Examples of diols may be ethyleneglycol, propyleneglycol, propane-1,3-diol, allyloxypropanediol, butane-1,4-diol, butane-1,3-diol, butane-2,3-diol, butane-2,4-diol, butane dioxyethyleneglycol, butene-1,4-diol, butyne-1,4-diol, pentane-1,4-diol, pentane-1,5-diol, hexane-1,6-diol, decane-1,10-diol, dodecane-1,12-diol, octadecane-7,18-diol, 4,4'-dihydroxydicyclohexylmethane, 4,4'-dihydroxydicyclohexyldimethylmethane bis-2-hydroxyethylterephthalate, xyleneglycol, hydroquinone, 4,4'-dihydroxydiphenylmethane, 4,4'-dihydroxydiphenyldimethylmethane, resorcinol, thiodiethyleneglycol, glycols responding to the formula

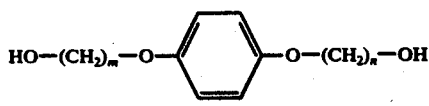

wherein m and n are integers of from 1 to 4, and their analogues and mixtures. Among them, it is preferred to use ethyleneglycol, propane-1,3-diol, butane-1,4-diol and the glycol represented by the formula:

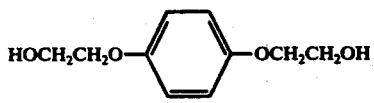

and combinations thereof. Combinations of the preferable diamines and diols may also be utilized.

The equivalent ratio H/NCO, of the active hydrogens of the chain-extending agent to the isocyanate groups of the prepolymer may be between 0.8 and 1.1, preferably between 0.90 and 1.05. The prepolymer may be cured at a temperature of from 50 to 140° C, preferably 110° C and below. When the ratio is less than 0.80, and when the temperature is higher than 140° C, the chemical cross-link density increases because of the formation of allophanate and/or biuret bondings.

As discussed above, when the polydiene glycol which has been prepared with use of lithium-based catalyst and has the specified number average molecular weight range and the specified functionality is used, and when the chemical cross-link density of the polyurethane is controlled to be $4 \times 10^{-5}$ mole/cc, and less the tear strength of the polydiene polyurethane increases significantly and the mechanical properties such as tensile strength and elongation also increase satisfactorily.

Furthermore, it has been found that, when the specified carbon blacks in the specified quantities are mixed with the prepolymer before curing on preparing the polydiene polyurethane, the tear strength and the tensile strength increase significantly as compared with those of the non-loaded polydiene polyurethane. The carbon blacks, wherein the ratio $lp/d$ of the chain length between physical cross-links in the corresponding non-loaded polyurethane to the particle size of the carbon black is in the range of from 2.4 to 15, should be employed. When the $lp/d$ is less than 2.4, the tear strength increases little while the tensile strength increases to some extent. If the $lp/d$ is greater than 15, the molecular weight of the polydiene glycol is so high that some troubles occur on processing and curing. It is a matter of course that tear strength does not increase so much in the region over $4 \times 10^{-5}$ mole/cc for the chemical cross-link density of the corresponding non-leaded polyurethane, even if $lp/d$ is within the range of from 2.4 to 15. The $lp/d$ can be controlled by changing any one of the molecular weight of polydiene glycol, the class of diisocyanate or chain-extending agent and the particle size of carbon black. This may also be achieved by the combined use of the fillers having good compatibility with polydiene glycol.

Suitable carbon black is of neutral such as Furnace Black. An acidic carbon black such as Channel Black is undesirable, because a side reaction by the acidic carbon black will occur between the functional groups on their surface and the isocyanate groups in the prepolymer, and this causes sometimes the decrease of some mechanical properties of the polyurethane. The particle size of the carbon black particles is preferably in the range of from 100 to 300 angstrom as the average particle size within the range of $2.4 \leq lp/d \leq 15$. The quantity of carbon black to be added is preferably in the range of from 10 to 50 parts by weight per 100 parts by weight of the total amounts of the composition before the addition of carbon black, such as, prepolymer and chain-extending agent.

The carbon black, prepolymer and chain-extending agent may be mixed in any orders with conventional mixers. The H/NCO ratio and the curing conditions in the carbon black loaded system are the same as described in the non-loaded system.

The polydiene polyurethane according to the present invention can be used for tire treads, solid tires, rolls for rice-hulling rollers, conveyor belts, V-shaped transmission-belts, lining materials for sleeve hoses, rubber screens, dock fenders, bumpers, shoe soles, traction drive belts and the like.

The number average molecular weight of the polydiene glycol is determined by means of the vapor pressure osmometry in benzene with benzyl as a reference, after the sample has been dried for 17 hours under the pressure less than 4 mm Hg at 70° C.

The functionality of the polydiene glycol is derived from the number average molecular weight divided by the hydroxyl group equivalent molecular weight (OH eq. M.W.) which has been determined by reacting the above dried sample with excess hexamethyldisilazane and trimethylchlorosilane in carbon tetrachloride, removing the residual silylation agents and the ammonium chloride formed, and then carrying out NMR spectroscopy of the silylated sample in terms of the equation for polybutadiene glycol as an example.

OH equivalent molecular weight $$\text{OH equivalent molecular weight} = \frac{54.1 \times 9 \times (B + C)}{(2 + \chi) \times A} + 73$$

wherein
A = the area of the peak assigned to -OSi(CH$_3$)$_3$ protons,
B = the area of the peaks assigned to the =CH$_2$ protons at 1,2-bonds in polybutadiene parts,
C = the sum of the areas of the peaks assigned to the =CH$_2$ protons at 1,4-bonds and 1,2-bonds in polybutadiene parts, and $x$ = 1,2-bond fraction in polybutadiene parts, being equal to $2B/B + 2C$.

The residual lithium content in the polydiene glycol is determined by flameless atomic absorption analysis, after the precisely weighed sample has been dissolved in a given volume of toluene-methanol (10:1 v/v) mixture.

The chemical cross-link density, $\nu$THF, is determined by Cluff's method (E. F. Cluff et al. J. Polymer Sci., 45, 341–345 (1960)) from the correlation of the compressive strain and the stress, which has been measured with Reticulometer made by Wallace Inc. in Great Britain, after the test pieces in the form of disk 6 mm in diameter $\times$ 1 - 2 mm in thickness has been swelled in tetrahydrofuran.

The chain length between physical cross-links $lp$ is calculated by the following equation $$lp = D \cdot L / (\nu CHCl_3 - \nu THF) \cdot M$$

wherein
D = the density of the test piece in g/cc
L = the chain length per monomer unit in angstrom
M = the molecular weight of the monomer unit
$\nu CHCl_3$ = the cross-link density obtained by swelling in chloroform in a similar manner as $\nu$THF, that is equal to the sum of the chemical cross-link density and the physical cross-link density, and L is represented as the algebraic sum of each bond lengthes in the monomer unit on the basis of the micro structure where the length of carbon-carbon single bond is 1.54 angstrom, that of carbon-carbon double bond is 1.34 angstrom and the bond angles should not be taken into account. In the case of polybutadiene glycol as an example, M is 54.00 and L is represented by the following formula:

L = 5.96 $\times$ (the 1,4-bonding content) + 3.08 $\times$ (the 1,2-bonding content)

The tear strength is measured by using a specimen of 10 mm in width, 2 mm in thickness and 100 mm in length having a cut of 2 mm at its center holding the specimen at an interval of 40 mm between two chucks with the cut at the center of the interval and carrying out the test in the tensile test machine made by Toyo-Baldwin Co., Ltd., at the rate of 5 cm a minute. The calculation is made in accordance with the procedure of Yagii et al. (Yagii and Ninomiya, Journal of the Society of Rubber Industry Japan, 41, 116 (1968)).

The tensile strength, elongation and the modulus at 10% elongation are measured with the conventional method at the rate of 5 cm a minute.

The invention will be more clearly understood with reference to the following examples; however, those examples are intended to illustrate the invention and are not to be construed to limit the scope of the invention.

EXAMPLE I

A 10l reactor which had been well dried and purged with argon, was charged with 600 g of 1,3-butadiene, 210 m.moles 1,4-dilithiobutane diluted with 210 ml of diethyl ether, and 6l of benzene, and polymerization was carried out for 3 hours at 40° C. After the reactor was cooled to 5° C, 46 of ethylene oxide was added and reaction was carried out for 15 hours. After 150 ml of water was added, the contents were transferred to a container. In order to remove some impurities, the polymer was treated 4 times with 20l of water containing 4.8 moles of hydrogen chloride for 2 hours at 40° C with stirring, and purified 6 times with 20l of water for 2 hours at 40° C. Then the solvent in the product was evaporated to dryness under reduced pressure at 70° C. The polybutadiene glycol obtained had number average molecular weight of about 3,100, and OH-equivalent molecular weight of about 1,630, the functionality of 1.90 and the residual lithium content less than 0.1 ppm.

100 parts by weight of the polybutadiene glycol were dehydrated with stirring for 3 hours under a pressure below 4 mm Hg at 90° C. After the temperature was dropped to 80° C, 10.8 parts by weight (corresponding to 2.02 with respect to NCO/OH ratio) of tolylenediisocyanate in which the ratio of 2,4- to 2,6-isomer was 80/20 were mixed with, and allowed to react under nitrogen atmosphere for 6 hours at 80° C. The NCO content of the prepolymer formed was 1.95%. 100 parts by weight of the prepolymer were mixed with 6.20 parts of weight of 4,4-methylenebis(2-chloroaniline) corresponding 1.00 with respect to $NH_2/NCO$, the mixture was cast into a slab mould, and cured for 3 hours at 100° C. The resulting polyurethane was then aged for a week under an atmosphere of 50% humidity and at 30° C and subjected to measurement of $\nu$THF and the mechanical properties as set forth in Table I.

EXAMPLE II – IV

A series of specimens was prepared according to the procedure of Example I in which the catalyst content was varied in order to adjust their molecular weight. Table I shows the results of the physical tests together with the data of OH-equivalent molecular weight, fuctionality, lithium content and $\nu$THF.

COMPARATIVE EXAMPLE I

The polybutadiene glycol "R-45M", manufactured by ARCO Chemical Company, having a number average molecular weight of 2,880 and not containing lithium was used for preparing polybutadiene polyurethane according to the procedure of Example I. The mechanical properties of the specimen are incorporated in Table I.

Table I

| Run No. | Comparative Example I | Example I | Example II | Example III | Example IV |
|---|---|---|---|---|---|
| Specification of polybutadiene glycol | | | | | |
| Number average molecular weight | 2,880 | 3,100 | 2,510 | 2,810 | 1,910 |
| OH eq. M.W. | 1,250 | 1,630 | 1,250 | 1,520 | 990 |
| Functionality | 2.30 | 1.90 | 2.06 | 1.86 | 1.93 |
| Residual lithium content, ppm | <0.1 | <0.1 | <0.1 | <0.1 | <0.1 |
| NCO % of prepolymer | | | | | |
| Calculated | 2.96 | 2.33 | 2.96 | 2.49 | 3.61 |
| Observed | 3.09 | 1.95 | 3.12 | 2.53 | 3.57 |
| Cross-link density of polyurethane | | | | | |
| $\nu_{THF} \times 10^5$ mole/cc | 17.1 | 2.8 | 0.6 | 0.1 | 0.06 |

Table I-continued

| Run No. | Comparative Example I | Example I | Example II | Example III | Example IV |
|---|---|---|---|---|---|
| Mechanical properties of polyurethane | | | | | |
| Modulus at 10% elongation, kg/cm$^2$ | 255 | 172 | 207 | 232 | 338 |
| Tensile strength, kg/cm$^2$ | 109 | 166 | 143 | 205 | 195 |
| Elongation, % | 180 | 540 | 545 | 810 | 575 |
| Tear energy, kg/cm | 6 | 16 | 34 | 38 | 48 |

The FIGURE on the basis of the results of Examples I – IV and Comparative Example I indicates the significant improvement of tear strength in the range of the $\nu$THF not more than $4 \times 10^{-5}$ mole/cc. Furthermore Table I shows that the polyurethane having the $\nu$THF not more than $4 \times 10^{-5}$ mole/cc has well-balanced mechanical properties, and the polyurethane with that range is excellent in tensile strength and elongation.

The result of Comparative Example I shows that because the functionality of the polydiene glycol is greater than 2.1, the $\nu$THF of the polyurethane is remarkably increased.

EXAMPLE V

100 Parts by weight of the polybutadiene glycol having the number average molecular weight of 2640 and the lithium content less than 0.1 ppm were dehydrated for 3 hours under pressure below 4 mm Hg at 90° C with stirring. After the temperature was lowered to 80° C, the glycol was mixed with 13.2 parts by weight (corresponding to the NCO/OH of 2.02) of the tolylenediisocyanate used in Example I, and allowed to react for 6 hours at 80° C. 100 Parts by weight of the resulting prepolymer containing the NCO of 2.76% were mixed with 30 parts by weight of the Super Abrasion Furnace (SAF) carbon black having the particle size of 200 angstrom, which had been well-dried for 3 hours under the pressure less than 4 mm Hg at 180° C, in a paint mill with three rolls. Then the mixture was mixed with 8.77 parts by weight (corresponding to the NH$_2$/NCO = 1.00) of methylenebis(2-chloroaniline), and cured in the slab mould of 1 mm in thickness for 3 hours at 100° C. After the polyurethane was aged for a week under 50% humidity at 30° C, its mechanical properties were measured. In order to determine the $lp/d$ and $\nu$THF of the polyurethane, a specimen without carbon black was prepared in accordance with a similar method and used for the measurement of $\nu$THF and $\nu$CHCl$_3$. Table II shows the results.

EXAMPLES VI – VIII

A series of specimens was prepared according to the procedure of Example V in which the polybutadiene glycol having the molecular weight shown in Table II were used and the carbon black to be loaded with was replaced by neutralized High Color Channel (HCC) black having the particle size of 110 angstrom. Table II shows the mechanical properties of the resulting specimens.

COMPARATIVE EXAMPLES II AND III

Two kinds of specimen were prepared according to the procedure of Example V in which the number average molecular weight of the polybutadiene glycol was varied to 2,640, and Semi Reinforcing Furnace (SRF: d = 700 angstrom) and High Abrasion Furnace (HAF: d = 270 angstrom) black were used. The properties measured are set forth in Table II.

COMPARATIVE EXAMPLE IV

A specimen was prepared according to the procedure of Example V in which the polybutadiene glycol used was the same as that of Comparative Example I, having the number average molecular weight of 2,880 and the functionality of 2.30. The measured properties are set forth in Table II.

Table II

| Run No. | Comparative Example II | Comparative Example III | Example V | comparative Example IV | Example VI | Example VII | Example VIII |
|---|---|---|---|---|---|---|---|
| Specification of Polybutadiene glycol | | | | | | | |
| Number average molecular weight | 2,640 | 2,640 | 2,640 | 2,880 | 2,280 | 2,640 | 2,630 |
| OH eq. M.W. | 1,330 | 1,330 | 1,330 | 1,250 | 1,190 | 1,330 | 1,320 |
| Functionality | 1.98 | 1.98 | 1.98 | 2.30 | 1.92 | 1.98 | 1.99 |
| Residual lithium content, ppm | <0.1 | <0.1 | <0.1 | <0.1 | <0.1 | <0.1 | <0.1 |
| NCO % of prepolymer | | | | | | | |
| Calculated | 2.84 | 2.84 | 2.84 | 2.96 | 3.08 | 2.84 | 2.82 |
| Observed | 2.76 | 2.76 | 2.76 | 3.09 | 3.19 | 2.76 | 2.76 |
| Type of carbon black | SRF | HAF | SAF | SAF | Neutralized HCC | Neutralized HCC | Neutralized HCC |
| lp/d | 0.7 | 1.9 | 2.4 | 2.8 | 2.8 | 4.3 | 6.2 |
| Cross-link density of polyurethane | | | | | | | |
| $\nu_{THF} \times 10^5$ mole/cc | 0.7 | 0.7 | 0.7 | 17.1 | 1.4 | 0.7 | 3.2 |
| $\nu_{CHCl_3} \times 10^5$ mole/cc | 19.1 | 19.1 | 19.1 | 34.2 | 30.1 | 19.1 | 16.0 |
| Mechanical properties of polyurethane | | | | | | | |
| Modulus at 10% elongation, kg/cm$^2$ | 310 | 381 | 388 | 398 | 466 | 408 | 375 |
| Tensile strength, kg/cm$^2$ | 187 | 217 | 228 | 217 | 281 | 231 | 301 |
| Elongation, % | 555 | 460 | 510 | 183 | 570 | 495 | 530 |

Table II-continued

| Run No. | Comparative Example II | Comparative Example III | Example V | comparative Example IV | Example VI | Example VII | Example VIII |
|---|---|---|---|---|---|---|---|
| Tear energy, kg/cm | 30 | 23 | 72 | 8 | 93 | 51 | 171 |

Table II includes the data of Examples V–VIII and Comparative Examples II – IV with increase in $lp/d$. The $\nu$THF values of these polyurethanes are within the specified range except for that of Comparative Example IV in which the functionality of the polybutadiene glycol is higher than the specified range. Table II shows that the tear strength of the polybutadiene polyurethane is highly dependent on $lp/d$. The tear energy of the black loaded polyurethanes is higher than 50 kg/cm in the region of $lp/d \geq 2.4$, and is significantly superior to that of the non-loaded polyurethanes, 10 – 50 kg/cm. Especially the tear energy, 171 kg/cm, of Example VIII is the value which has not been obtained previously. The tear strength in Comparative Example IV is extremely low as compared with that in Example VI in spite of the same $lp/d$, because the $\nu$THF of the former is greater than $4 \times 10^{-5}$ mole/cc. As can be seen from those results, when a carbon black is loaded in order to increase the tear strength of polyurethane, it should be necessary to control the $\nu$THF as well as $lp/d$ within the specified range. Furthermore the increase of the tensile strength in the Examples V – VIII is more remarkable than that of Comparative Examples II – IV, and it may be easily concluded that the polyurethane according to the present invention has well-balanced mechanical properties.

EXAMPLES IX – XII

A polydiene glycol was prepared in a similar manner as in Example I in which the catalyst content was varied for the adjustment of molecular weight. After the polymerization, the product was divided into four equal parts, each aliquot was treated twice with 5 l of water and 1.2 moles of hydrochloric acid for 2 hours at 40° C with stirring, and then purified with 5 l of water for 2 hours at 40° C a total of 5 times, 4 times, 3 times or twice for Examples IX – XII respectively. The purified polymer solutions were dried in the same manner as in Example I. These polymers have the number average molecular weight of 2050, the functionality of 1.9 and the residual lithium content of 2.9, 8.8, 26.7 or 98.2 ppm for Examples IX – XII respectively. These polydiene glycols were used to prepare prepolymers according to Example I.

Any undesirable abnormal gelation on preparing prepolymer was not observed in Examples IX, X and XI. The specimen of Example XII was about to gel at the completion of the reaction of 6 hours, however this phenomenon in that Example did not exert a harmful effect upon the following curing process. These facts suggest that it is desirable to decrease as much as possible the residual lithium content in the polydiene glycol.

EXAMPLES XIII and XIV

Polymerization was carried out according to the procedure of Example I in which the following recipe was used:

| | |
|---|---|
| 1,3-butadiene | 800 g |
| benzene | 5 l |
| 1.45 m.mole/ml 1,4-dilithiobutane in diethyl ether/benzene (15/4 v/v) mixture | 290 ml |
| ethylene oxide | 89 g. |

After 150 ml of water was added, the contents were transferred to a container. The products were divided into four equal parts, two of the aliquots were treated twice with 5 l of water containing 0.6 moles of sulfuric acid for 2 hours at 40° C with stirring, and then washed with 5 l of water for 2 hours at 40° C four times in Example XIII, and one time in Example XIV.

The washed polymer solutions were dried in the same manner as in Example I. These polybutadiene glycols have the number average molecular weight of 2130, the OH-equivalent molecular weight of 1,110, the functionality of 1.92, and the residual lithium content of less than 0.1 ppm for Example XIII and 167 ppm for Example XIV.

10 G of each polybutadiene glycol were added to 2,4-tolylenediisocyanate so as to be 2.02 of NCO/OH with stirring, and reacted for 3 hours at 80° C with stirring. Any abnormal gelation was not observed in these runs. These results show that polybutadiene glycols treated with sulfuric acid are prepolymerized without abnormal gelation regardless of the residual lithium content.

What is claimed is:

1. A process for preparing a polydiene polyurethane having high tear strength, which process comprises reacting
   a. a polydiene glycol prepared with use of a dilithio compound as a catalyst, and having a functionality of from 1.8 to 2.1 and a number average molecular weight of from 1,000 to 5,000, the residual lithium content being below 30 ppm,
   b. a diisocyanate compound, and
   c. a chain-extending agent selected from diamine and diol compounds by the prepolymer method, the equivalent ratio of the isocyanate groups in said polydiene glycol being 1.5 to 3.0, the equivalent ratio of active hydrogens in said chain-extending agent to isocyanate groups in said prepolymer being 0.8 to 1.1, and the curing temperature being 50 to 140° C, the polydiene polyurethane so obtained having a chemical cross-link density of $4 \times 10^{-5}$ mole/cc or less.

2. A process for preparing a polydiene polyurethane having high tear strength, which process comprises reacting
   a. a polydiene glycol prepared with use of dilithio compound as a catalyst, and having a functionality of from 1.8 to 2.1, a number average molecular weight of from 1,000 to 5,000 and a residual lithium content of less than 30 ppm after treatment with mineral acid other than sulfuric acid;
   b. a diisocyanate compound, and
   c. a chain extending agent selected from diamine and diol compounds by the prepolymer method, and compounding 10 to 50 parts by weight of carbon black per 100 parts by weight of the total amount of said polydiene glycol, said diisocyanate compound and said chain-extending agent before curing, the equivalent ratio of the isocyanate groups in said polydiene glycol being 1.5 to 3.0, the equivalent ratio of active hydrogens in said chain-extending agent to the isocyanate groups in said prepolymer being 0.8 to 1.1, and the curing temperature being 50° to 140° C, the ratio of chain length between physical cross-links in the corresponding non-loaded polyurethane to the particle size of said carbon black being established within the range of from 2.4 to 15, and the chemical crosslink density of said corresponding non-loaded polydiene polyurethane being $4 \times 10^{-5}$ mole/cc or less.

3. A high tear-strength polydiene polyurethane produced according to the process of claim 1.

4. The process of claim 1 wherein said number average molecular weight is within the range of from 1,300 to 3,500.

5. The process of claim 1 wherein said polydiene glycol is treated with sulfuric acid to remove residual lithium on preparing said polydiene glycol.

6. The process of claim 1 wherein said polydiene glycol is treated with mineral acid except sulfuric acid on preparing said polybutadiene glycol and the residual lithium content is less than 30 ppm.

7. The process of claim 1 wherein said mineral acid is hydrochloric acid.

8. The process of claim 1 wherein said polydiene glycol is polybutadiene glycol.

9. The process of claim 1 wherein said chemical crosslink density is $2.0 \times 10^{-5}$ mole/cc and less.

10. The process of claim 2 wherein said carbon black is neutral carbon black.

11. The process of claim 2 wherein said carbon black is selected from super abrasion furnace (SAF) carbon black and neutralized high color channel (HCC) carbon black.

* * * * *